(12) United States Patent
Pultz

(10) Patent No.: US 12,240,318 B2
(45) Date of Patent: Mar. 4, 2025

(54) MULTI-GEAR PORTAL

(71) Applicant: 74 Weld Inc., El Cajon, CA (US)

(72) Inventor: Quinn Pultz, Encinitas, CA (US)

(73) Assignee: 74 WELD, INC., El Cajon, CA (US)

( * ) Notice: Subject to any disclaimer, the term of this patent is extended or adjusted under 35 U.S.C. 154(b) by 153 days.

(21) Appl. No.: 17/723,268

(22) Filed: Apr. 18, 2022

(65) Prior Publication Data

US 2022/0332185 A1 Oct. 20, 2022

Related U.S. Application Data

(60) Provisional application No. 63/176,159, filed on Apr. 16, 2021.

(51) Int. Cl.
*B60K 17/04* (2006.01)
*B60K 7/00* (2006.01)

(52) U.S. Cl.
CPC .......... *B60K 17/046* (2013.01); *B60K 7/0015* (2013.01); *B60K 2007/0038* (2013.01); *B60K 2007/0061* (2013.01); *B60Y 2200/221* (2013.01)

(58) Field of Classification Search
CPC ... B60B 35/001; B60B 35/003; B60K 17/046; B60K 2007/0061; B60K 17/043; B60Y 2200/221
See application file for complete search history.

(56) References Cited

U.S. PATENT DOCUMENTS

| | | | |
|---|---|---|---|
| 8,844,669 B2 | 9/2014 | Armfield | |
| 10,889,182 B1* | 1/2021 | Lee | B60K 17/043 |
| 11,299,042 B2 | 4/2022 | Stephan et al. | |
| 11,554,662 B2 | 1/2023 | Stephan et al. | |
| 11,766,890 B2* | 9/2023 | Takeuchi | B60B 27/0078 |
| | | | 301/6.5 |
| 2005/0026737 A1 | 2/2005 | Czysz | |
| 2006/0207384 A1* | 9/2006 | Hardy | F16H 57/021 |
| | | | 74/640 |
| 2006/0213712 A1 | 9/2006 | Mayne | |
| 2012/0181850 A1* | 7/2012 | Armfield | B60B 35/003 |
| | | | 301/132 |
| 2018/0272865 A1* | 9/2018 | Fukudome | B60K 17/043 |

OTHER PUBLICATIONS

PDF of website: https://www.moogparts.com/parts-matter/all-about-hub-assemblies.html (Year: 2020).*

(Continued)

*Primary Examiner* — Thomas C Diaz
(74) *Attorney, Agent, or Firm* — Eleanor Musick; Torrey Pines Law Group PC

(57) ABSTRACT

A portal assembly has a housing for attachment to the vehicle axle and enclosing a gear assembly having an input gear linked to the axle shaft for rotating around a first rotational axis and an output gear positioned within a second lower rotational axis that converts rotation of the input gear to rotation of the output gear. An output axle is driven by the output gear for transferring rotational force to a unit bearing located outside of the housing. The unit bearing is attached to and transfers rotational force to a wheel hub.

20 Claims, 14 Drawing Sheets

(56) References Cited

OTHER PUBLICATIONS

Axle Tech Bolt on Portal Axle for 14 Bolt & Dana 60 Axles—Lift-N-Gears, Bolt-On Portals from Axle Tech; 2024 Motor Trend Motor Trend Group, LLC; pp. 1-7, https://www.motortrend.com/how-to/131-0908-axletech-bolt-on-portal-.
Polaris RZR Pro R 4" Portal Gear Lift SuperATV; pp. 1-9, https://kombustionmotorsports.com/products/polaris-rzr-pro-r-portal-g.
Spidertrax Ultimate Unit Bearing (5 on 5-1/2" × 5/8" Studs × 40 Spline); 2 pages, https://www.spidertrax.com/Ultimate-Unit-Bearing-RH-5-1-2-x-5 -.
SuperATV.com, Installation Instructions 6" Portal Gear Hubs for Polaris RZR Pro R®/ R4, Aug. 24, 2022, pp. 1-21.
SuperATV.com, Installation Instructions, 4", 30% Dual Idler Portal Gear Hubs for Polaris RZR Pro R®/ R4, Apr. 10, 2023, pp. 1-22.
SuperATV.com, Installation Instructions, 6", Dual Idler Portal Gear Hubs for Polaris RZR Pro R®/ R4, Aug. 22, 2022, pp. 1-22.
SuperATV.com, Installation Instructions, Gen 3 Portal Gear Hubs: for Polaris RZR Pro R®/ R4, Aug. 23, 2022, pp. 1-19.
Ultimate Unit Bearings w/Trophy Truck Pattern; blog.spidertrax.com/category/unit-bearing, Jan. 23, 2015; Spidertrax Ultimate Unit Bearing (5 on 5-12" × 5/8" Studs × 40 Spline), https://www.spidertrax.com/Ultimate-Unit-Bearing-RH-5-1-2-x-5-.

\* cited by examiner

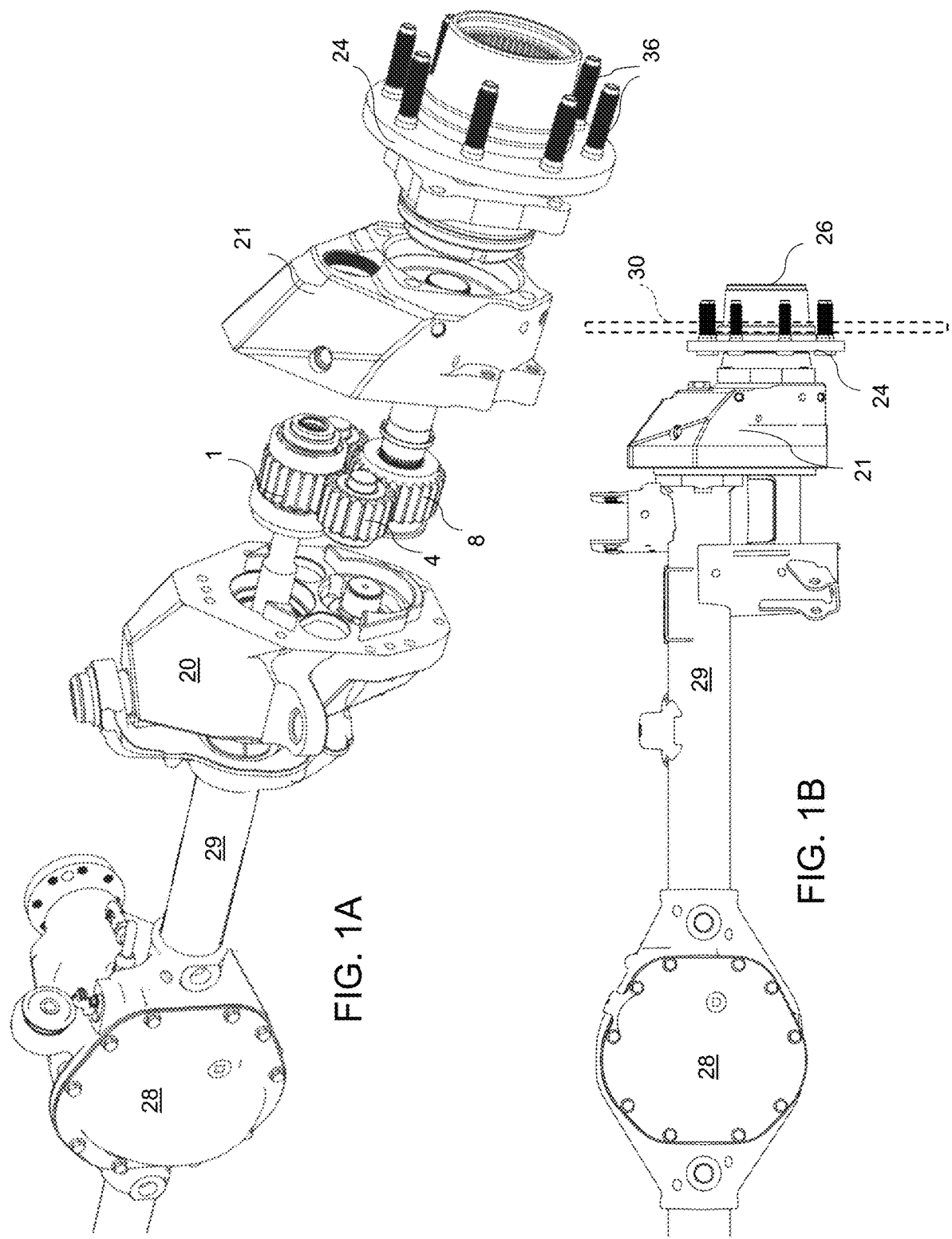

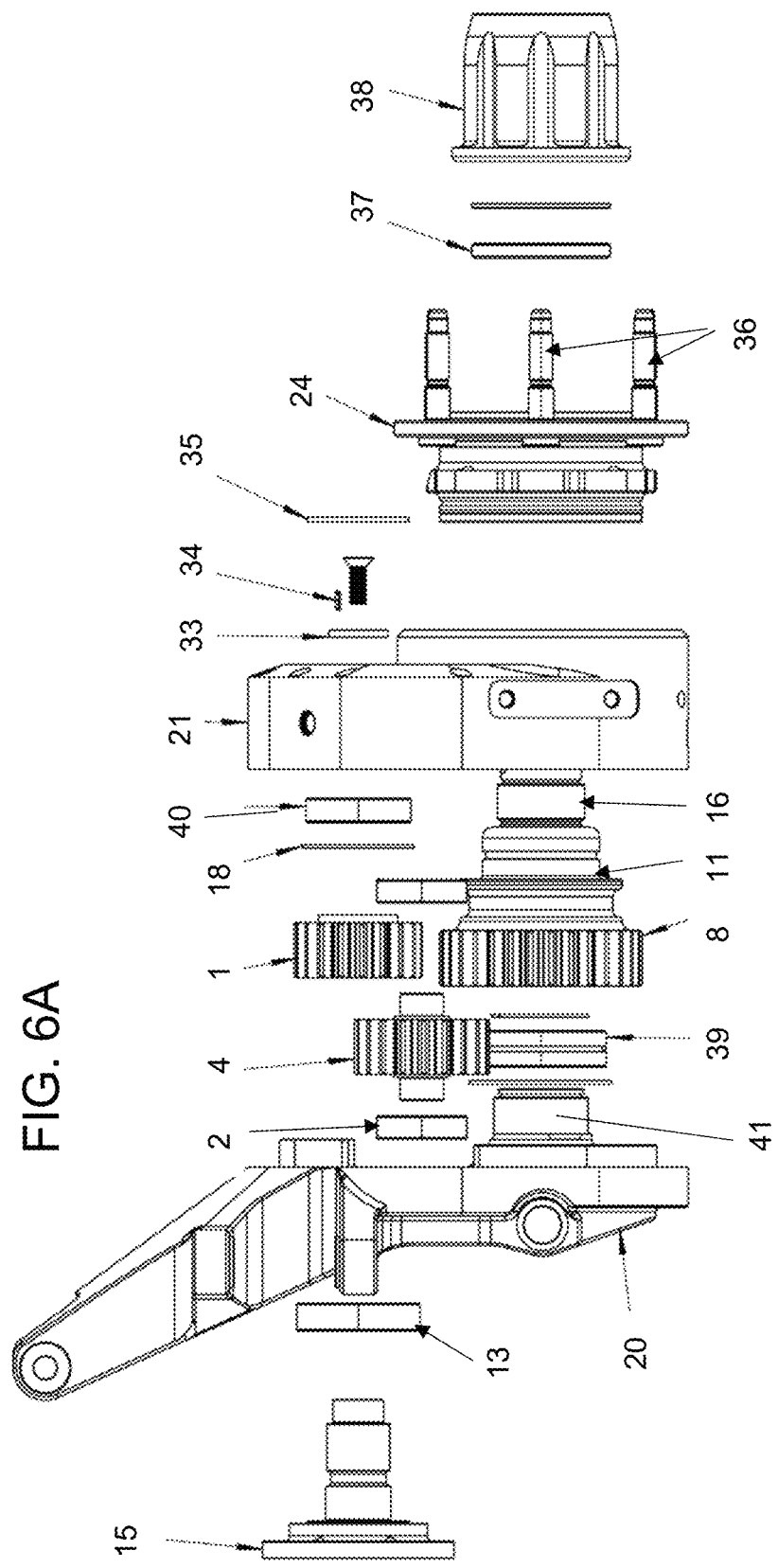

DETAIL C

MULTI-GEAR PORTAL

RELATED APPLICATIONS

This application claims the benefit of the priority of U.S. provisional application No. 63/176,159, filed Apr. 16, 2021, which is incorporated herein by reference in its entirety.

FIELD OF THE INVENTION

The present invention relates to a portal wheel end for connection to an axle of a vehicle to increase the ground clearance of the axle.

BACKGROUND

On vehicles equipped with a solid axle, the lowest point is the differential yoke. With four-wheel drive vehicles, the first modification many drivers wish to make is to install larger tires, which will provide improved grip off-road with the correct tread pattern. One of the primary reasons for installing larger tires is that they raise the height of the differential yoke.

Portal axles are modifications that have been in use for decades to allow the vehicle to accommodate larger tires by reducing the gearing at each wheel. Portal axles are also used to raise the differential yoke, lifting the vehicle, and providing increased ground clearance. In a solid axle application, the portal provides a gear reduction at each wheel. Rather than running through a bearing and on to the hub, the axle connects to a gearbox, i.e., the "portal" or "portal box", with a housing enclosing a drive gear, two idler gears, and a large driven gear that directs drive down to the wheel hubs, which are several inches lower than the case. With this assembly, the hubs can be mounted lower, increasing the ground clearance of the axle itself.

Portal wheel ends are used in a wide variety of applications ranging from military vehicles to aftermarket applications for off-road vehicles. Since each axle has a different configuration, the portal must be specifically configured for a specific mounting arrangement and packaging constraint of the given axle in order to be properly connected. In other words, the portal wheel end is typically only used with one specific make and model of axle. The requirement for specific configurations makes portals costly and less accessible to off-road enthusiasts who may wish to make aftermarket modifications to their four-wheel drive vehicles. A typical portal installation can be prohibitively expensive, running on the order of $25,000 or more. Existing portal gear boxes use old technology of grease-packed wheel hubs utilizing different spindle configurations. Also, because portals have more parts, they require more maintenance, adding to their expense. In addition to the differential, there are oil reservoirs required for both portals. Replacement of the oil in these reservoirs is recommended every 8,000 km.

Four gear portals are known in the art. One example of a commercially-available four gear portal is described in U.S. Pat. No. 8,844,669, the disclosure of which is incorporated herein by reference. One of the drawbacks of this and other portal designs has been the difficulty in installing and servicing the portal. This problem is particularly pronounced given the tendency for gear failure in traditional portal axles since the vehicle or machine weight is placed directly on the gears within the portal.

Accordingly, the need remains for a cost-effective portal that is universally applicable to most vehicles, is easier to install, and requires less maintenance. The present invention is directed to such a portal.

BRIEF SUMMARY

According to an embodiment of the inventive multi-gear portal, a unit bearing is integrated into a portal to standardize the portal gear box and allow for its incorporation into many different vehicles including newer OEM applications such as popular four-wheel drive vehicles, for example, JEEP® WRANGLER®, FORD® BRONCO® or RAPTOR®, and TOYOTA® TACOMA®, TUNDRA®, and 4RUNNER®. In these applications, the OEM uses a wheel speed sensor which is commonly integrated into the unit bearing wheel hub. The inventive approach takes the existing unit bearings and integrates them into a universal portal box, giving it a modular application. The upright/backer/knuckle will be application-specific, however, but the key goal of the inventive approach is to incorporate a common unit bearing into a modular portal platform that will facilitate modification of a wide range of vehicles.

The bolt on portal is designed to adapt to either OEM or aftermarket axles, or to independent suspensions, to provide gear reduction and additional ground clearance in the form of a lift, and while retaining all necessary OEM sensors though the integration of the OEM compatible unit bearing. The OEM style unit bearing also allows the user the option of running either a full-time drive slug or a lockable style wheel hub which can allow the front unit bearing to spin independent of the portal gear box, allowing for better fuel economy and less wear on the axle components.

The present invention is directed to an improved portal design that facilitates installation and subsequent access and serviceability through the integration of a unit bearing into the portal assembly. The upper input shaft of the inventive portal is also retained in a way that allows the user to easily remove the stub shaft without taking apart the portal. This integration of a unit bearing and use of a removeable input shaft is applicable to both 2- and 4-gear portals.

In one aspect of the invention, a portal assembly for a vehicle axle with a rotatable axle shaft includes a housing configured for attachment to the vehicle axle; a gear assembly disposed within the housing, the gear assembly comprising: an input gear linked to the axle shaft, the input gear configured to rotate around a first rotational axis in response to a rotational force from the axle shaft; an output gear disposed along a second rotational axis spaced at a distance lower than the first rotational axis, the output gear configured to convert rotation of the input gear to rotation of the output gear; an output axle shaft configured to be driven by the output gear, the output axle shaft extending through an opening in the housing; and a unit bearing attached to the housing and configured to be driven by the output axle, the unit bearing having fasteners extending therefrom for attachment to a wheel hub. In some embodiments, the output gear is in direct contact with the input gear. A pair of idler gears may be configured to transfer rotational force from the input gear to the output gear. In some embodiments, the output gear may be integrally formed with the output axle shaft. In other embodiments, the output axle shaft may have splines disposed at each of a distal end and a proximal end, wherein the proximal end engages with a corresponding spline in the output gear and the distal end engages with a corresponding spline in the unit bearing. In applications where the vehicle axle is a steering axle, the housing may include a knuckle portion configured for replacement of an existing knuckle portion on the axle. The input gear may have a plurality of internal splines configured to receive corresponding external splines on the axle shaft. The axle shaft may be linked to the upper gear of by means of a u-joint or constant velocity (CV) joint.

In another aspect of the invention, a portal assembly includes a housing having a proximal side configured for attachment to a vehicle axle with a stub shaft extending through a proximal opening, and a distal side having a distal opening; a gear assembly disposed within the housing, the gear assembly comprising: an input gear linked to the stub shaft, the input gear configured to rotate around a first rotational axis in response to a rotational force from the stub shaft; an output gear disposed along a second rotational axis spaced at a distance lower than the first rotational axis, the output gear configured to convert a rotational force of the input gear to rotation of the output gear; a pair of idler gears configured to transfer the rotational force from the input gear to the output gear; an output axle shaft extending through a distal opening, the output axle shaft configured to be driven by the output gear; and a unit bearing having a mounting plate attached to the distal side to cover the distal opening, the unit bearing configured to be linked to and driven by the output axle, the unit bearing having fasteners extending therefrom for attachment to a wheel hub. The output gear may be integrally formed with the output axle shaft, or the output axle shaft may have splines disposed at each of a distal end and a proximal end, wherein the proximal end engages with a corresponding spline in the output gear and the distal end engages with a corresponding spline in the unit bearing. In applications where the vehicle axle is a steering axle, the proximal side of the housing may include a knuckle portion configured for replacement of an existing knuckle portion on the axle. The input gear may have a plurality of internal splines configured to receive corresponding external splines on the stub shaft. The stub shaft may be linked to the upper gear of by means of a u-joint or constant velocity (CV) joint.

In still another aspect of the invention, a portal assembly includes a housing having a proximal side configured for attachment to a vehicle axle with a stub shaft extending through a proximal opening and a distal side having a distal opening; a gear assembly disposed within the housing and configured to effect a gear reduction from the stub shaft on a first rotational axis to an output axle shaft on a second rotational axis, wherein the second rotational axis is disposed at a lift spacing below the first rotational axis; and a unit bearing attached to the distal side and configured to be driven by the output axle shaft extending through the distal opening, the unit bearing configured for attachment to a wheel hub. The gear assembly may include an upper gear disposed along the first rotational axis and a lower gear disposed along the second rotational axis and may further include a pair of idler gears configured to transfer rotational force from the input gear to the output gear. In some embodiments, the output gear may be integrally formed with the output axle shaft. In other embodiments, the output axle shaft has splines disposed at each of a distal end and a proximal end, wherein the proximal end engages with a corresponding spline in the output gear and the distal end engages with a corresponding spline in the unit bearing. In applications where the vehicle axle is a steering axle, the proximal side comprises a knuckle portion configured for replacement of an existing knuckle portion on the vehicle axle.

The inventive portal design can be used in either a solid axle application or in an independent suspension. Power is input into the upper gear, drives a pair of idler gears, which in turn drive a lower output gear in a 4-gear application. The 4-gear portal design includes an upper gear, two idler gears, and a lower drive gear. The upper gear is supported by a bearing on either side of the gear. The gear is splined to accept an axle shaft through which power is input into the portal box. This upper gear transmits power through a pair of idler gears. The idler gears are stabilized by needle bearings which are nested inside the hollow gear. This reduces weight and the loose needle design allows the idlers to accommodate heavy radial loads. The idler gears transfer power to a lower gear. The lower gear is splined to accept an axle shaft connecting the gear to the unit bearing via either a drive slug or a selectable locking hub. The lower gear can also have an integrated axle shaft which directly drives a unit bearing.

In a 2-gear application, the upper gear directly drives the lower gear which in turn drives a wheel hub. The gear can drive a wheel hub, or it can have an independent shaft that drives the wheel hub. The same integration of a unit bearing as described above applies here. The lower gear can drive a shaft which is used to drive the unit bearing. It can also have a shaft integrated into the lower gear which then drives the unit bearing either directly or through an additional drive gear.

In an independent suspension application, the inventive design lifts the input CV, allowing the vehicle to reduce CV angle. This can translate to greater ground clearance, but only if the lower suspension point is optimized. A major benefit in the case of independent suspension is the ability to reduce the angle of the CV at static "ride height." Reducing the CV angle at ride height provides the potential for greater wheel travel and steering.

BRIEF DESCRIPTION OF THE DRAWINGS

FIG. 1A is a perspective partially exploded view of a 4-gear portal according to an embodiment of the invention connected to a steering axle; FIG. 1B is a side view of a 4-gear portal connected to a non-steering axle.

FIG. 2B is a perspective view of the portal gears with the portal box removed; FIG. 2C is a perspective view of an alternative configuration of the upright/backer and portal box for a 4-gear portal.

FIG. 6A is an exploded side view of the 4-gear portal of FIG. 2C that employs a direct drive approach.

DETAILED DESCRIPTION OF EMBODIMENTS

Figure 2A:
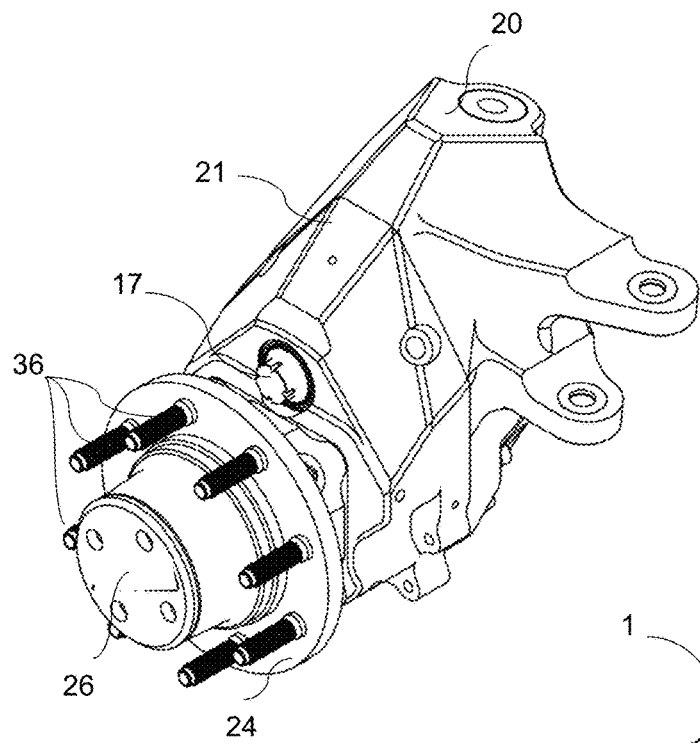
FIGS. 2A-2C are perspective views of a 4-gear portal for a steering axle according to an embodiment of the invention.

The inventive bolt-on portal design disclosed herein provides two key improvements: an improved upper stub shaft assembly, and integration of the unit bearing. The integration of the unit bearing and use of a removeable input shaft are applicable to both 2- and 4-gear portals. While some figures may show slight variations in the outer housing configuration (which may be varied to fit certain vehicles), the same basic components are used in FIGS. 1A-7C such that the same reference numerals are used to identify components within both the 4-gear and 2-gear portal assemblies. Where a reference number is different between the two assemblies, the description specifies which portal design the number applies to. The reference numerals and their corresponding numbers are listed in Table 1 below.

TABLE 1

| Ref. # | Description |
|---|---|
| 1 | upper portal gear |
| 2 | upper inner bearing |
| 3 | upper outer bearing |
| 4 | idler gear |
| 5 | needle bearing for idler gear |
| 6 | idler gear inner thrust bearing |
| 7 | idler gear outer thrust bearing |
| 8 | lower portal gear |
| 9 | lower gear needle bearing |
| 10 | lower gear inner thrust bearing |
| 11 | lower gear outer thrust bearing |
| 12 | upper stub shaft nut O-Ring |
| 13 | upper inner gear seal |
| 14 | lower drive axle seal |
| 15 | upper stub shaft |
| 16 | lower drive axle shaft |
| 17 | upper stub shaft retainer; sealing nut |
| 18 | misc. snap rings to hold bearings in place |
| 19 | locating pin to help with case half alignment and separation |
| 20 | backer/upright/knuckle depending on application, e.g., rear non steering, independent suspension, or steering knuckle |
| 21 | portal box |
| 22 | idler gear pin |
| 23 | upper gear outer seal |
| 24 | unit bearing |
| 25 | drive gear |
| 26 | drive gear cap |
| 27 | lower shaft spacer |
| 28 | differential |
| 29 | axle |
| 30 | wheel hub |
| 31 | backer (2-gear) |
| 32 | upright (2-gear) |
| 33 | stub retaining washer |
| 34 | stub retaining pin |
| 35 | stub shaft window cover |
| 36 | bolts |
| 37 | hub nut |
| 38 | hub cap |
| 39 | inlaid bearing |
| 40 | upper back bearing |

In any portal application, the functionality of the portal remains constant. Referring to FIGS. 1A and 1B, when external power applied to axle 29 via differential 28, that power is transferred though an input gear 1, to a pair of idler gears 4, to a lower drive gear 8, which, in turn, transfers power a wheel hub (indicated via dashed lines 30 in FIG. 1B), which is attached via bolts 36. In some embodiments, the gear dimensions are selected to provide a 1.19 gear reduction at the hub. A portal can come in several configurations. Most common is a steering solid axle, as in FIG. 1A, where the portal bolts to an inner knuckle of the axle and replaces the traditional outer knuckle assembly used in steering applications. A second would be a non-steering solid axle configuration, such as the example shown in FIG. 1B. A third would be an independent steering application. A fourth would be an independent non steering application. These and other variations would be readily apparent to one of skill in the art and are, therefore, not separately illustrated or described.

In all applications, a portal lifts the centerline of the axle to provide additional ground clearance. On a solid axle, the portal lifts the vehicle a predetermined distance that is equal to the distance between center of the upper portal gear to the center of the lower portal gear. On an independent suspension, a portal does not necessarily lift the vehicle. In such applications, the portal allows the user to lift the CV input shaft and place the lower suspension point at a height that would not be achievable on a traditional four wheel drive application.

Power from an engine is most commonly transferred through a transmission to a transfer case (in four wheel drive applications) where the front and rear differentials 28 receive input and are powered by the respective drive shafts. The portal axle is mated to the differentials. In a solid axle steering application, the portal replaces the conventional knuckle, as shown in FIG. 1A. In a non-steering application (e.g., FIG. 1B), the portal utilizes what is commonly referred to as a "semi-float bearing cup" and replaces the semi-float axle shaft. The portal bolts to the semi float bearing cup and turns a traditionally semi-float application into a full float axle.

Figure 2B:
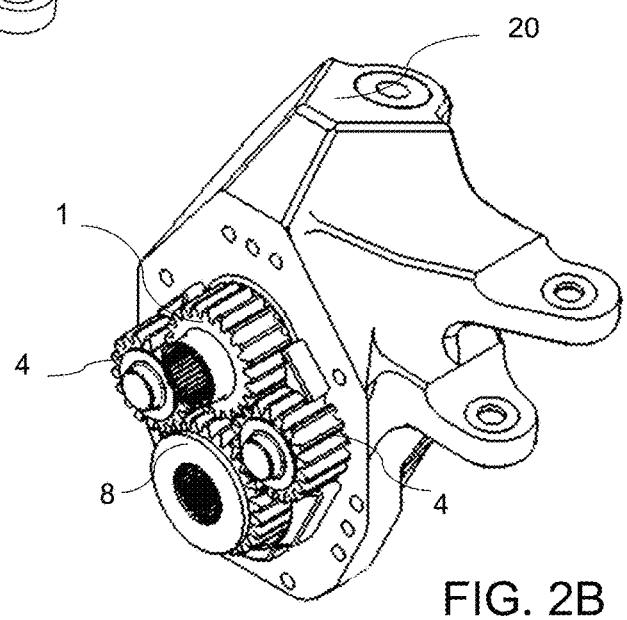
Figure 2C:
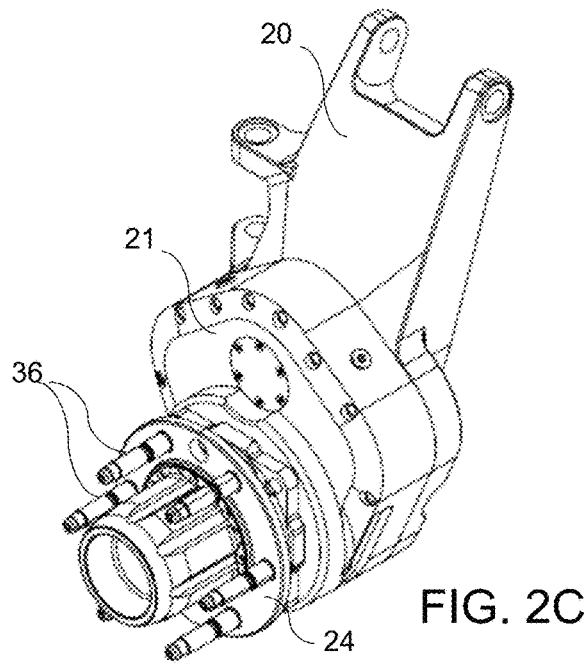
Figure 2D:
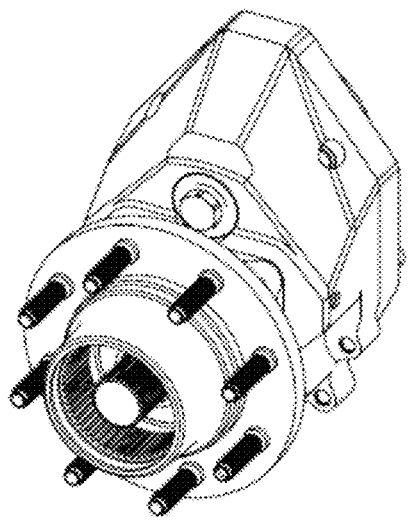
FIG. 2D is a perspective view of a 4-gear portal for a non-steering axle.

FIGS. 2A-2D illustrate examples of 4-gear portals configured for attachment to different OEM axle configurations where FIGS. 2A-2C depict examples of portals for attachment to a steering axle and FIG. 2D shows an example of a portal for a non-steering axle. This latter configuration differs from the other versions only in the exterior mounting features used for attachment of the housing, i.e., the portal box 21, to the axle. The internal operations and general principles are common across all configurations as will be detailed with reference to FIGS. 4A-7C below.

Referring to FIGS. 4A-5B, in a solid axle application of a 4-gear portal, power is first input into the upper portal gear 1. An axle shaft comes from the differential and is mated to the portal either directly to the splines of the upper gear of by means of a u-joint or constant velocity (CV) joint which is used on steering applications. The upper portal gear 1 is stabilized by an upper inner bearing 2 and upper outer bearing 3. These two bearings are nested into the portal box 21 and the portal knuckle 20. The upper gear 1 is sealed on the inner side by the upper inner gear seal 13 and sealed on the outer side by the upper stub retainer and sealing nut 17. This allows for the input axle to be installed once the portal is fully assembled.

As the upper portal gear 1 turns, it drives a pair of idler gears 4. These idler gears 4 are hollow and feature needle bearings 5 to control all radial loads. The needle bearings 5 are retained by a retaining ring 18. The idler gear 4 and bearing assembly 5 are held in place by an idler pin 22 which is also used to locate the portal box to the portal knuckle. The idler gears 4 are stabilized against axial loads by a pair of thrust bearings 6 and 7. Two idler gears 4 are used to increase the surface contact and overall strength of the unit. The idler gears 4 are transfer rotational force from of upper gear 1 to drive the lower gear 8 which then drives lower axle shaft 16 and the wheel hub via unit bearing 24.

Figure 3:
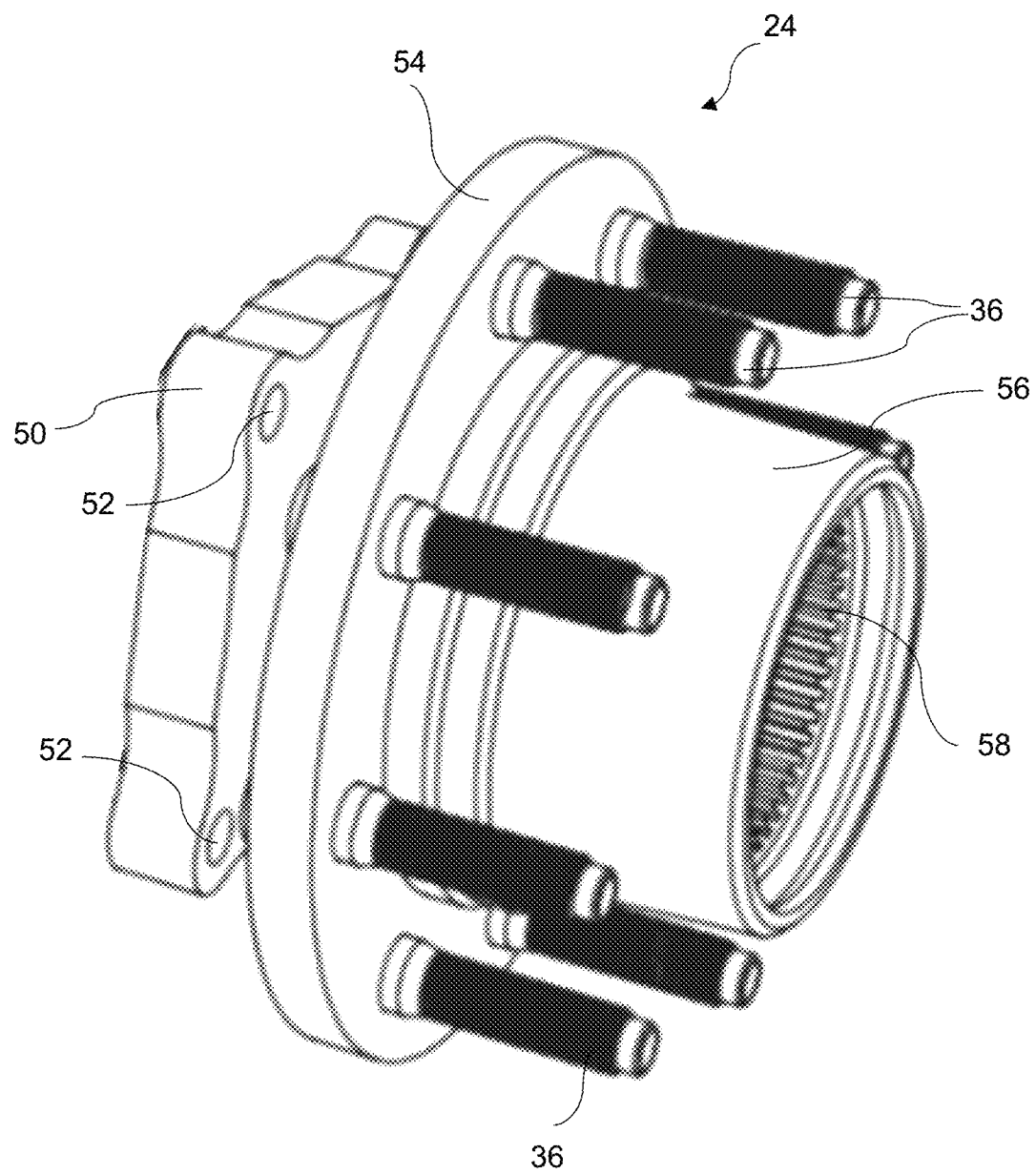
FIG. 3 is a perspective view of an example of a prior art unit bearing that may be used in embodiments of the inventive assembly.

Referring briefly to FIG. 3, an example of a prior art unit bearing 24 that may be used in the inventive assembly is illustrated. The unit bearing 24 is a common component used in all embodiments of the inventive system. Unit bearings are commercially available from a number of sources to fit a variety of different vehicles. One example of an appropriate unit bearing that is OEM-compatible for JEEP products is the 1-ton front unit bearing for JK/JL/JT ABS available from Currie Enterprises (Corona, CA). Selection of OEM-compatible unit bearings for other vehicle manufacturers will be within the level of skill in the art. The illustrated unit bearing 24 includes a mounting plate or flange 50 which is connected to the fixed (non-rotating) portion of the unit bearing with bores 52 arranged in a pattern that aligns with bolts 48 extending from portal box 21. (See, e.g., FIG. 5A-5B.) Nuts or other fasteners are used to affix plate 50 to the portal box. Alternatively, bolts may be inserted through bores 52 into corresponding threaded bores in portal box 21. Mounting plate 50 covers the outer side opening in portal box 21 through which the lower drive axle 16 passes for linkage with the wheel hub. Flange 54 has uniformly spaced bores for insertion of bolts 36 for attachment to the wheel hub. As described below, the drive axle extends from the interior of portal box 21 through the center of mounting plate 50 to mate with internal splines 58 of the unit bearing. As unit bearings are generally well-understood in the art, additional features of the bearing operation need not be further detailed.

Figure 4A:
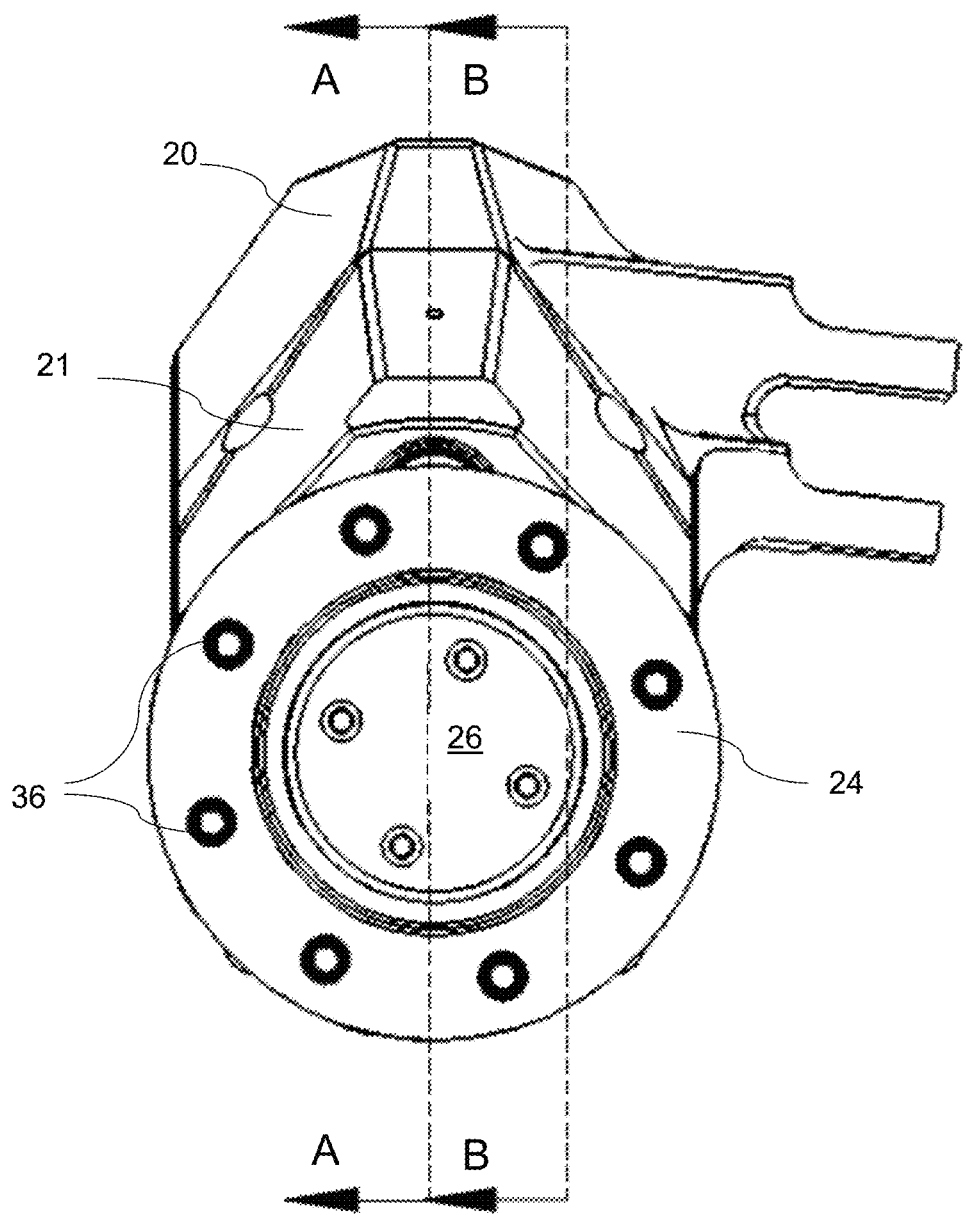
FIG. 4A is a front plan view of the 4-gear portal of FIG. 2A.
Figure 4B:
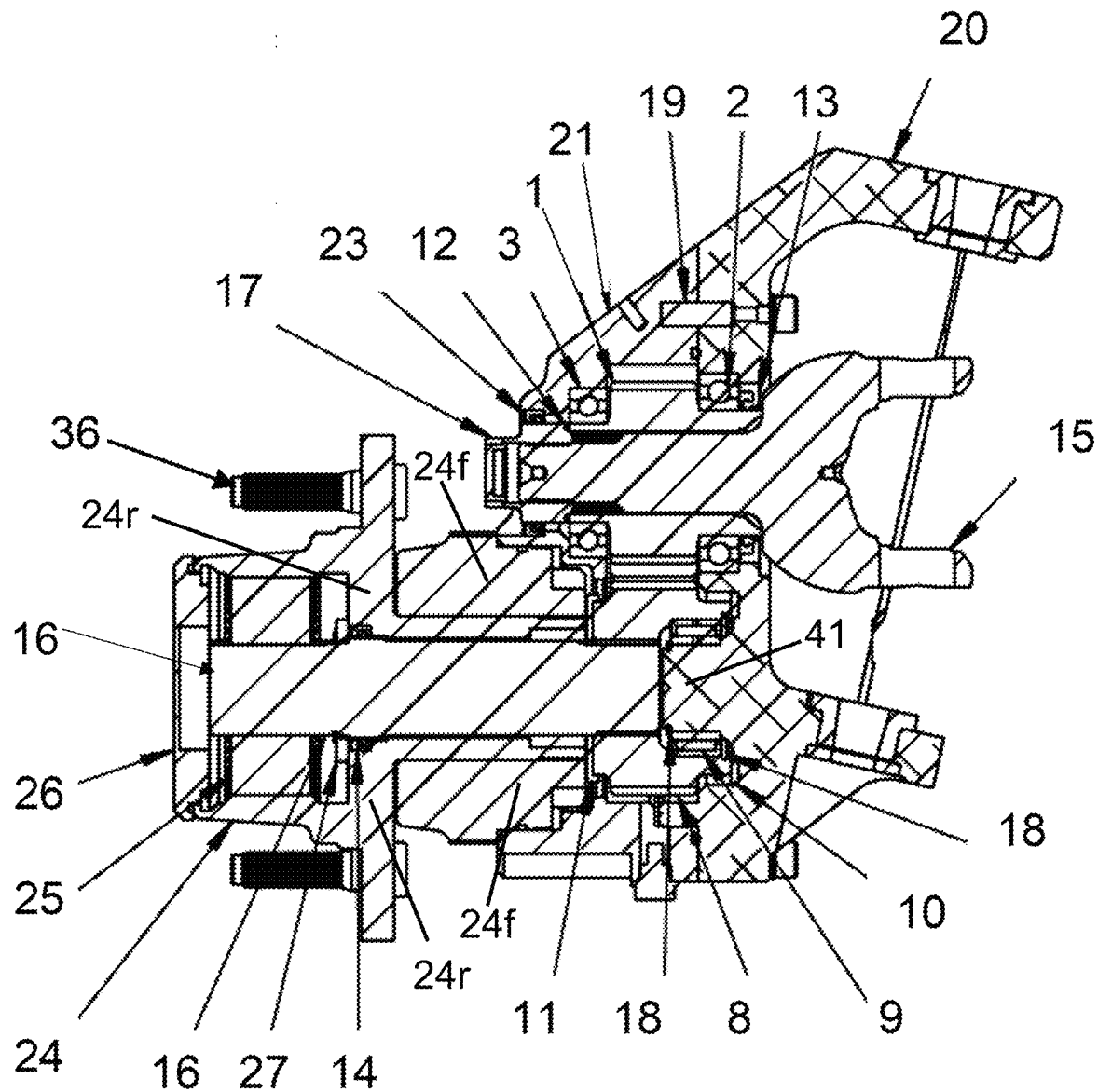
FIG. 4B is a cross-sectional view taken along line A-A of FIG. 4A, which cuts through the upper and lower gears.
Figure 4C:
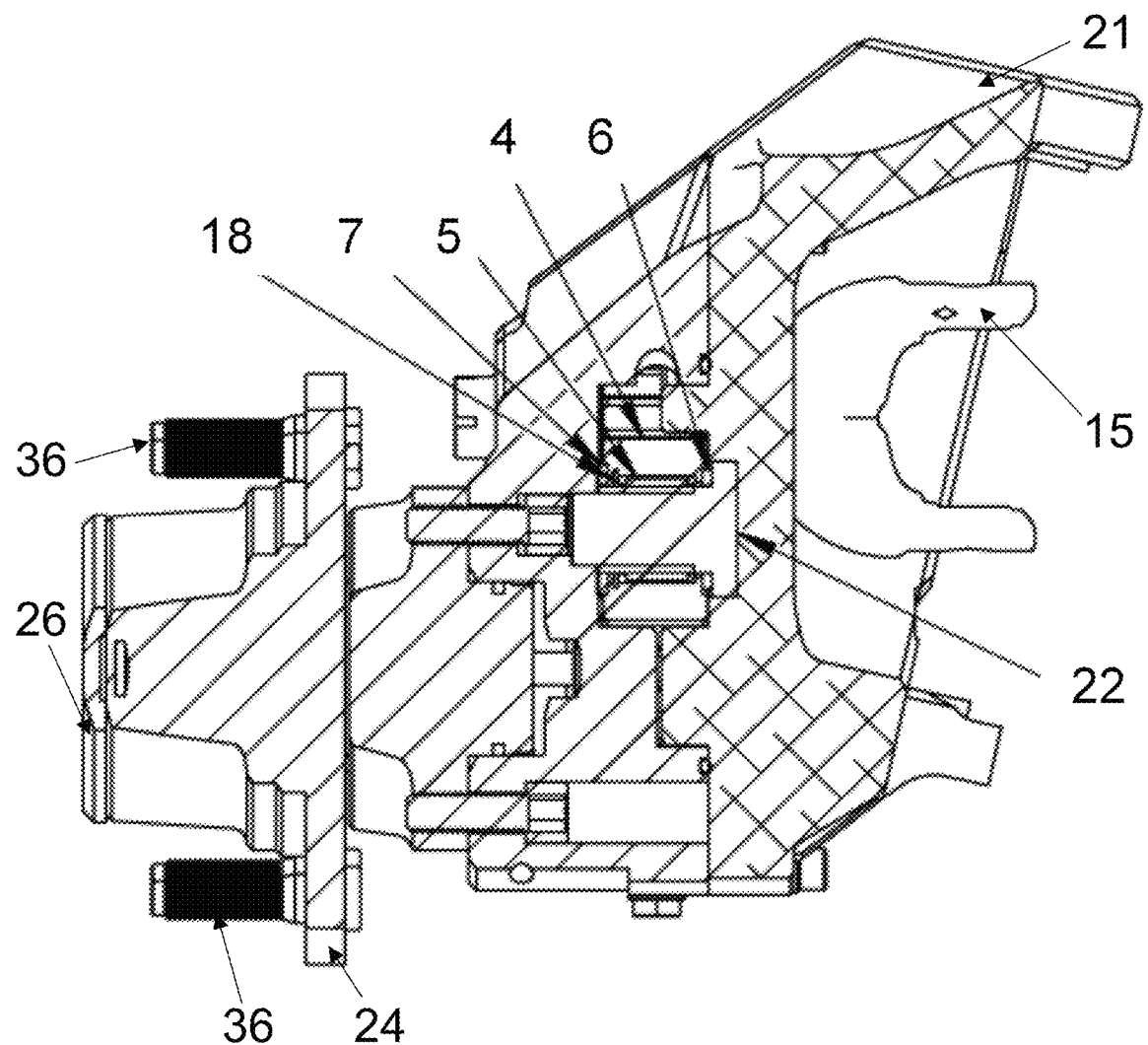
FIG. 4C is a cross-sectional view taken along line B-B of FIG. 4A, which cuts through the idler gears.
Figure 5A:
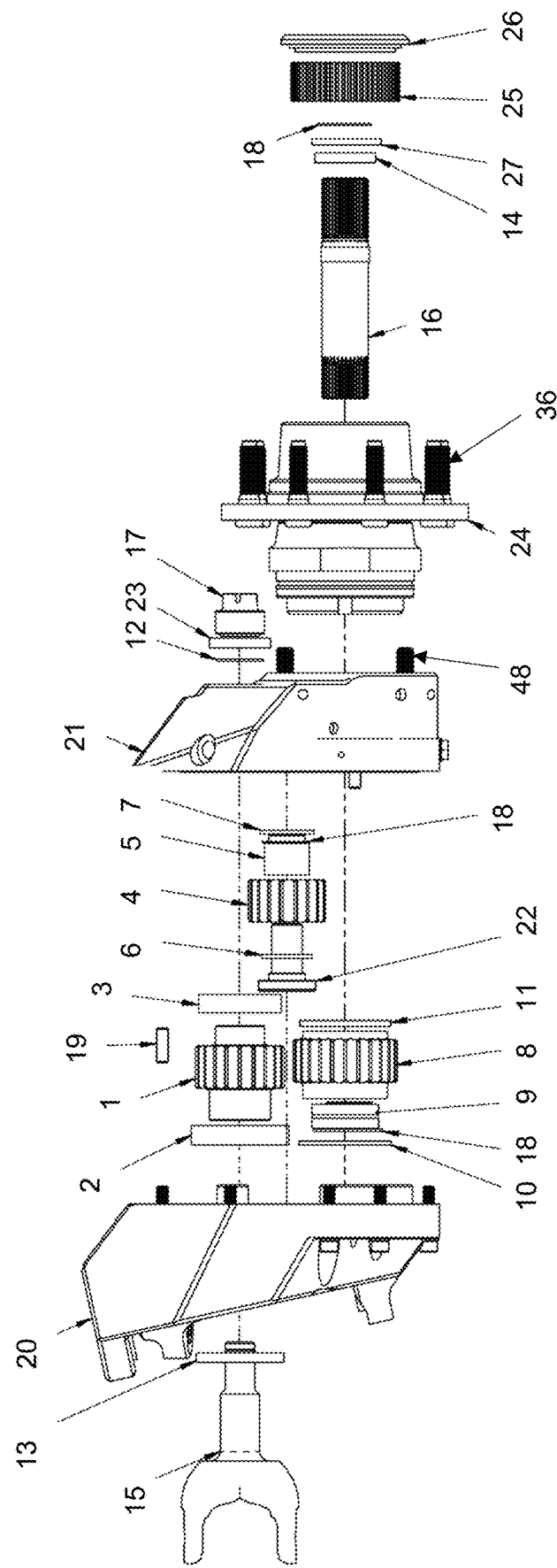
FIGS. 5A and 5B are exploded side and perspective views, respectively, of the 4-gear portal of FIG. 2A.
Figure 5B:
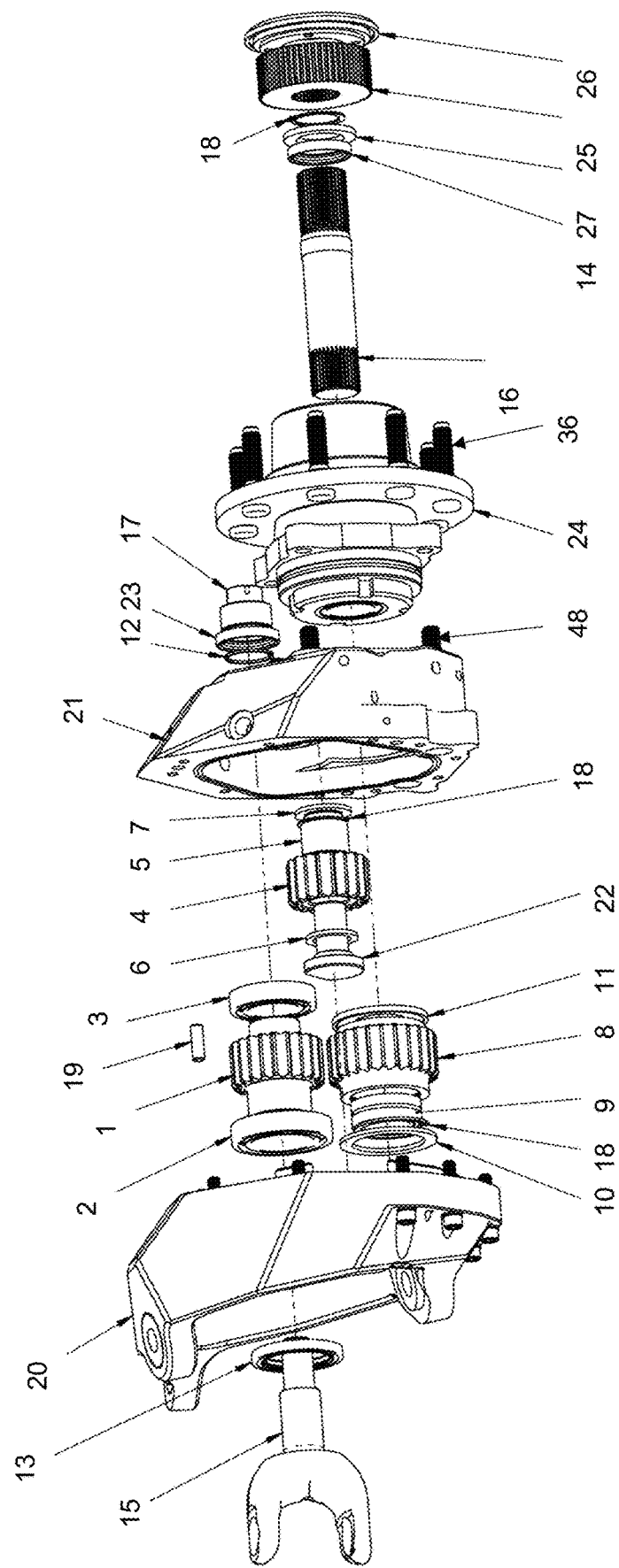

The drive of the lower gear 8 in this application is one of the key improvements incorporated into the inventive design. There are two distinctly different ways for the lower gear 8 to drive the unit bearing 24. The first is depicted in FIG. 4B, understanding of which is facilitated by referring to FIGS. 5A and 5B. The lower gear 8 is supported at its proximal end on lower gear rotational support 41 by lower gear bearing 9 coaxially disposed between the inner surface of the lower gear and rotational support 41. The distal portion of lower gear 8 is configured to mate with the proximal end of lower shaft 16 via a female (internal) spline. The proximal end of lower output shaft 16 engages the splines of the lower gear 8 and extends into the unit bearing 24 to fit within the center of the rotational portion 24r of unit bearing 24. (Rotational portion 24r rotates within fixed portion 24f attached to the portal box.) Shaft 16 is stabilized in the unit bearing 24 by the OEM-supplied needle bearing in unit bearing 24. For heavier applications, this can optionally be changed out to a bronze bushing. The unit bearing 24 is sealed by an outer double lip seal 14, which rides on the lower output shaft 16. This ensures that oil from the portal does not escape through the unit bearing 24. Power from the lower gear 8 is transferred through the lower output shaft 16 and into a drive gear 25. The drive gear 25 can be integrated into the lower output shaft 16, however, in some embodiments, and as shown in the figures, it is not formed as an integrated component primarily for economic reasons. More specifically, drive gears 25 are readily commercially available from a wide range of sources. Given their easy availability, while it is possible to manufacture an integrated component, selection of an appropriate commercially-available drive gear for this purpose, and assembly to the shaft 16, would be apparent to one of skill in the art.

A second approach for using the lower gear 8 to drive the unit bearing hub is by direct drive. An example of this implementation is shown in FIGS. 6A-6E. (Note that this embodiment corresponds to the variation shown in FIG. 2C.) In this embodiment, the lower gear 8, with its proximal end supported on lower gear rotational support 41 and lower gear bearing 39, and lower output shaft 16 are integrated as a single unit so that the distal portion of gear 8 directly drives the rotational portion 24r of unit bearing 24. In this configuration, the lower gear 8 has a splined drive section integrated into it. The lower gear 8 slides into the unit bearing 24 and is held in place by a hub nut 37. In this approach, the rotational portion 24r of unit bearing 24 has internal splines. The lower gear 8 has a similar profile to that of the rotational portion 24r of unit bearing 24 with matching external splines. In this case, the unit bearing 24 is preloaded by the gear, which means that the gear is used to hold the bearing pack together. This results in a more compact unit. The alternative is a bearing pack that is preloaded without the gear and the lower gear would simply register into the unit bearing but would not preload the bearing pack itself. Both the first and second approaches operate in the same manner, but the gear being used to preload the unit bearing 24 as detailed by in FIGS. 6B-6E is the most compact and efficient way of integrating a one piece gear into the unit bearing 24.

The retention of the upper stub shaft 15 and its ability to be easily removed and replaced is another important advantage of the inventive approach. The retention of the upper stub shaft 15 is described in detail with reference to FIGS. 6A-6E. Power is input from the differential through an axle shaft and into a CV joint. The CV joint at the wheel of the vehicle is bolted directly to a stub shaft 15. The stub shaft 15 has splines that register and drive the upper gear 1. The stub shaft 15 also features two bearing surfaces that register into bearings on both the portal box 21 and the upright/backer 20. When the stub shaft 15 slides into these bearings and through the gear 1, it is used to locate the gear and stabilize it within the portal gear assembly. In many applications, making the portal as compact as possible is an important goal. Some stub shaft retention methods tend to make the overall package wider. The consequence of a wider portal box or longer stub shaft is there is often not a lot of room for the vehicle's brake package. The inventive upper stub retention system was designed to be as compact as possible, yet still robust and strong. As described above, the stub shaft 15 slides into the portal box 21 after passing through the upright/backer 20. The bearing 40 in the upright/backer 20 is used to control only radial loads and thus allows the stub shaft 15 to easily pass through. The upper back bearing 40 is constrained in the portal box by a snap ring 18 shown in FIG. 6D. This allows the ball bearing to be used to control the axial and radial loads exerted on the stub shaft 15 once it is retained. The stub shaft 15 does not protrude beyond the back of the back bearing 40 and instead is cut to be 0.05" short of flush. The stub shaft retaining washer 33 is then placed on the back side of this bearing and a flat head bolt screws it into the stub which because of the 0.05" shorter length never allows the stub shaft to bottom against the stub shaft retaining washer 33. This pinches the bearing and uses the upper back bearing 40, which is constrained in the box, as a point of retention and captures the stub shaft 15 so that it cannot be removed from the vehicle. An offset pin hole is drilled in both the stub shaft 15 and the stub shaft retaining washer 33. A pin 34 is inserted through the stub shaft retaining washer 33 and into the stub shaft 15. Pin 34 ensures that washer 33 cannot spin independently of the stub shaft 15 and cause it to loosen.

Figure 6B:
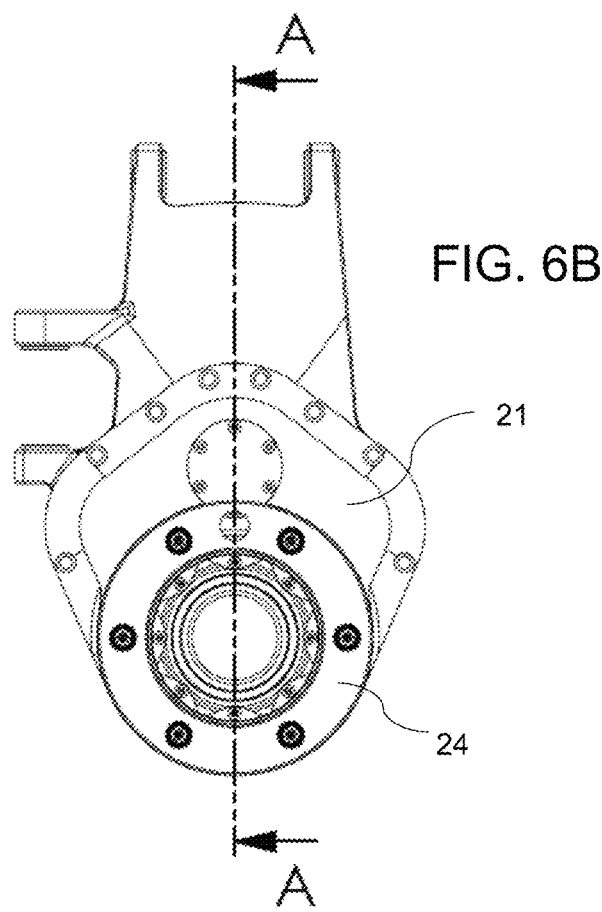
FIG. 6B is a front plan view of the 4-gear portal of FIG. 2C.
Figure 6C:
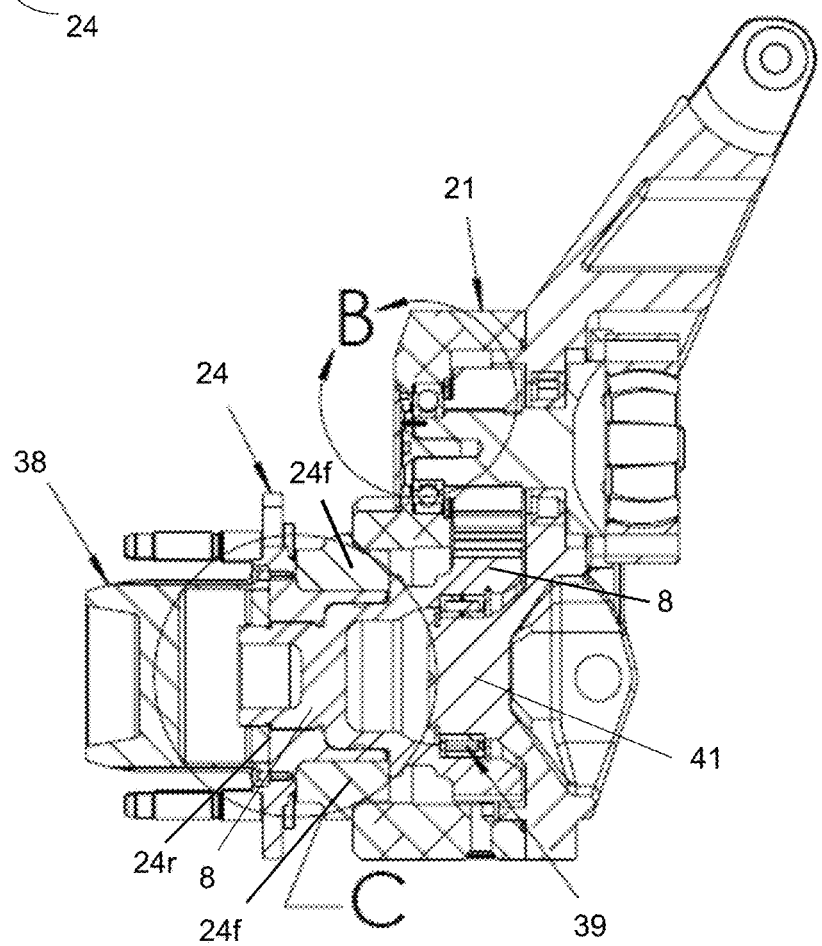
FIG. 6C is a cross-sectional taken along line A-A of FIG. 6B.
Figure 6D:
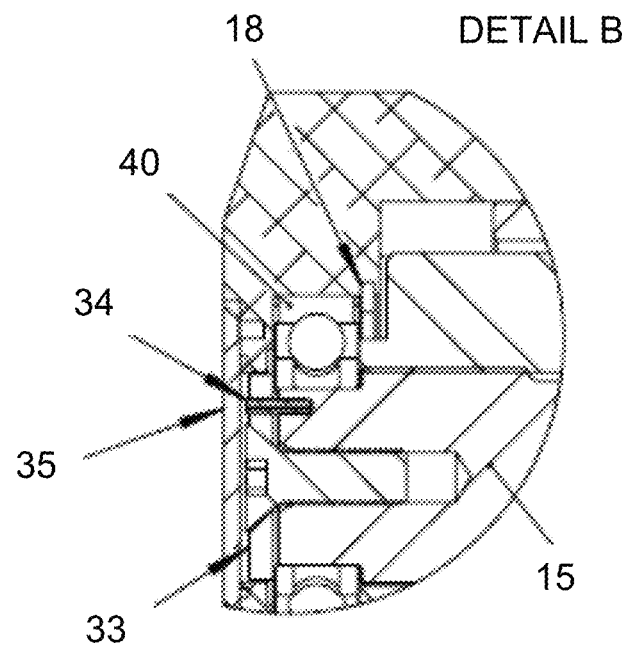
FIG. 6D is an enlarged detail view of Detail B of FIG. 6C.
Figure 6E:
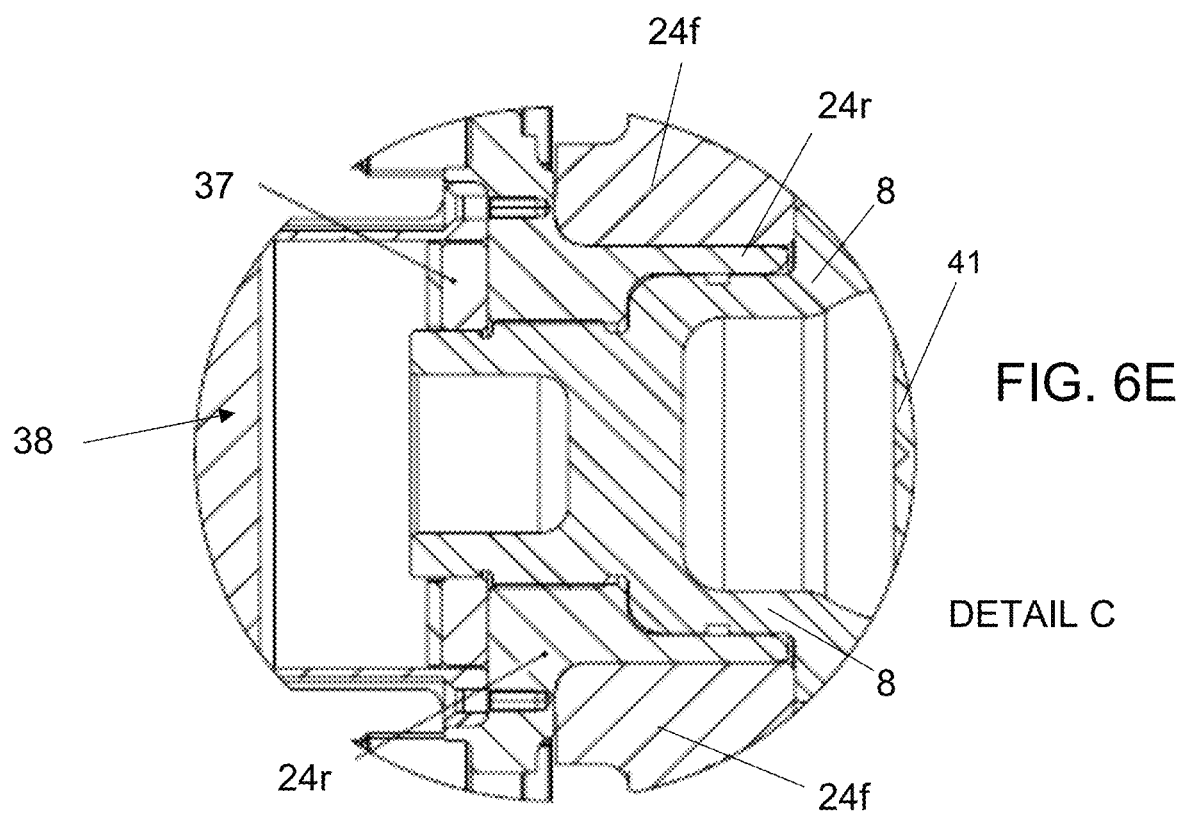
FIG. 6E is an enlarged detail view of Detail C in FIG. 6C.
Figure 7A:
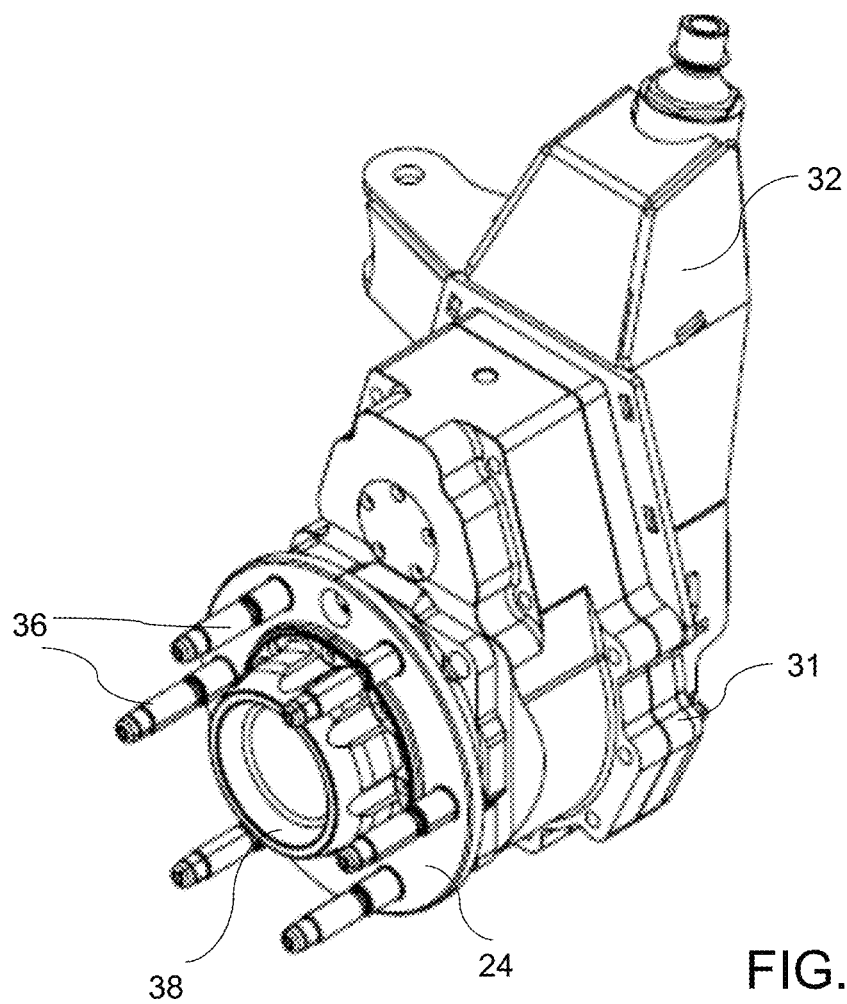
FIG. 7A is a perspective view of a 2-gear portal according to an embodiment of the invention.
Figure 7B:
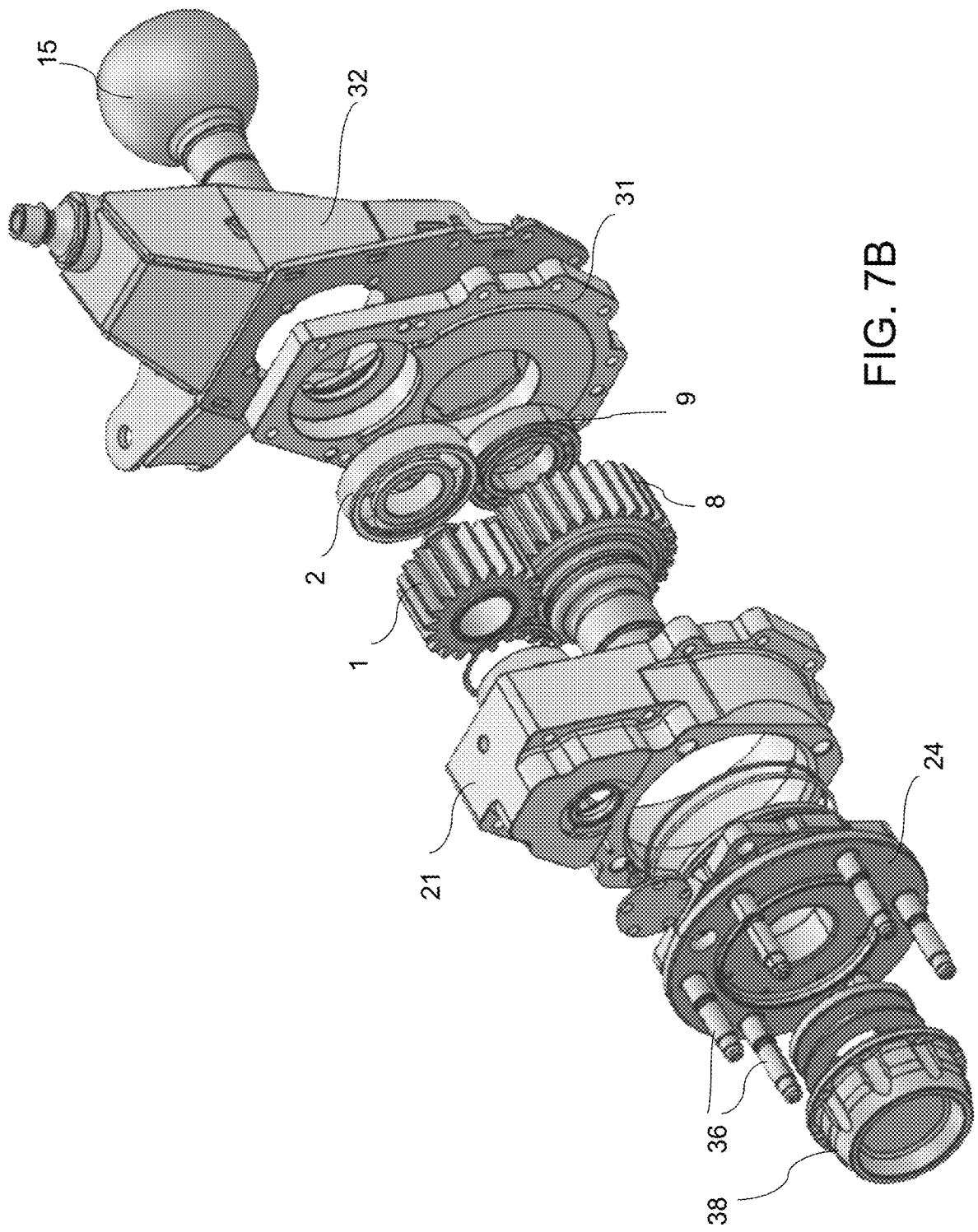
FIG. 7B is an exploded perspective view of a 2-gear portal.
Figure 7C:
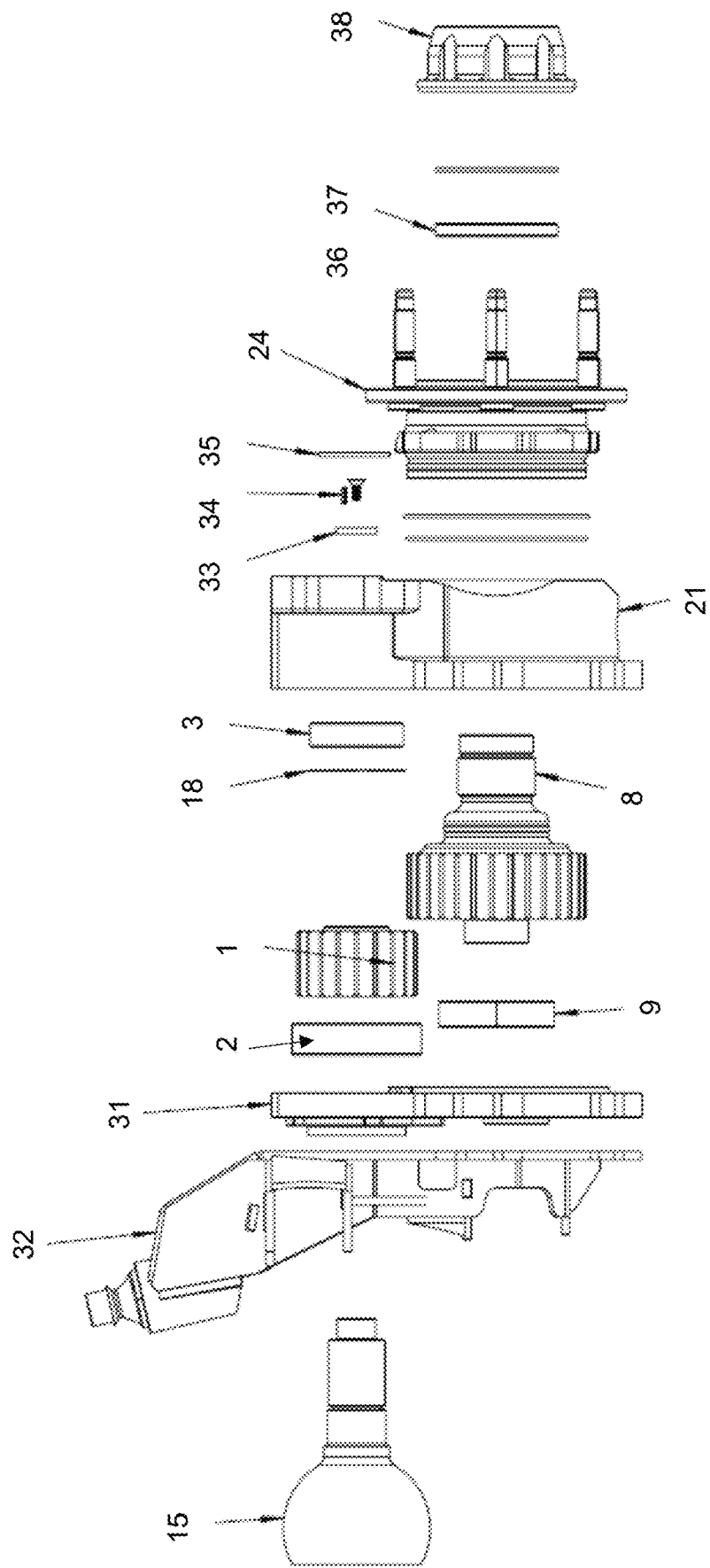
FIG. 7C is an exploded side view of the 2-gear portal.

The 2-gear embodiment shown in FIGS. 7A-7C is similar to the 4-gear embodiment shown in FIGS. 6A-6E. The input shaft 15 slides into upright 32 and backer 31, passes through a front bearing, through the input (upper) gear 1, and is retained by a washer 33 that sits behind the upper back bearing 40. The back bearing 40 presses into the portal box 21 and is retained by a spiral clip or retaining ring 18. This prevents the bearing from sliding forward if the stub shaft 15 experiences any axial loads. Once the bearing is properly constrained, the back bearing 40 can be used to retain the stub shaft 15 by pinching the inner race of the back bearing 40. This is accomplished by a retaining washer 33 behind the bearing which slides into place through a window 35 in portal box 21. The bolt pulls the stub 15 back against the bearing and uses the washer 33 to retain it, allowing axial thrust forces on the stub shaft to be carried by the back bearing 40. Stub retaining pin 34, which sits offset from the center of the stub shaft, is used to pin the retaining washer 33 to the stub 15 and prevents the retaining washer 10 from spinning. The details are shown in FIG. 6D for the 4-gear portal are similarly applicable to the 2-gear portal.

The integration of a unit bearing into a universal portal provides a modular approach, facilitating incorporation of portals into a wide range of vehicles that, using prior art approaches, would have required extensive custom modification. While the external housing configuration might need to be specially constructed to conform to space limitations in certain vehicles, the mechanics remain the same. The key goal of the inventive approach is to incorporate a common unit bearing into a modular portal platform. This simplifies the installation of a highly desirable modification for achieving gear reduction for larger tires with additional ground clearance, all while retaining all OEM sensors though the integration of the OEM-compatible unit bearing. This four corner unit bearing conversion provides full ABS compatibility. The inventive approach allows modification of vehicles for extreme off-road applications while retaining the comfortable ride quality of a stock vehicle. In an exemplary implementation, the gear dimensions are selected to provide a 19% gear reduction at the hubs, which allows a 19% larger tire without added stress on the drivetrain components. This enables replacement of stock 31 inch tires with up to 37 inch tires without requiring regearing of the axles. This adds 3.5 inches of ground clearance without contributing to bump steer, axle roll steer, or body roll steer.

The foregoing description and accompanying drawings provide illustrative examples of portal boxes that incorporate the principles of the invention. These examples are not intended to be limiting, and it will be readily apparent to those in the art that different permutations and combinations of the components features described herein may be made that still fall within the scope of the invention.

The invention claimed is:

1. A portal assembly for a vehicle axle having a rotatable axle shaft, the portal assembly comprising:
    a housing configured for attachment to the vehicle axle;
        a gear assembly disposed within the housing, the gear assembly comprising:
        an input gear linked to the axle shaft, the input gear configured to rotate around a first rotational axis in response to a rotational force from the axle shaft;
        an output gear having a proximal side disposed on a rotational support along a second rotational axis spaced at a distance lower than the first rotational axis, the output gear configured to convert rotation of the input gear to rotation of the output gear;
        an output gear bearing coaxially disposed between the proximal side of the output gear and the rotational support, the output gear bearing configured to support the proximal side of the output gear;
        an output axle shaft configured to be driven by the output gear, the output axle shaft having a proximal end configured to be received within a distal side of the output gear and a distal end configured to extend through an opening in the housing; and
    a unit bearing comprising a fixed portion attached to the housing and a rotating portion, the rotating portion configured to mate with the distal end of the output axle shaft so that the distal side of the output gear is fully supported by the unit bearing, wherein the unit bearing has fasteners extending therefrom for attachment to a wheel hub.

2. The portal assembly of claim 1, wherein the output gear is in direct contact with the input gear.

3. The portal assembly of claim 1, further comprising a pair of idler gears configured to transfer rotational force from the input gear to the output gear.

4. The portal assembly of claim 1, wherein the output gear is integrally formed with the output axle shaft.

5. The portal assembly of claim 1, wherein the output axle shaft has splines disposed at each of the distal end and the proximal end, wherein the proximal end engages with a corresponding spline in the output gear and the distal end engages with a corresponding spline in the unit bearing.

6. The portal assembly of claim 1, wherein the vehicle axle comprises a steering axle and the housing comprises a knuckle portion configured for replacement of an existing knuckle portion on the axle.

7. The portal assembly of claim 1, wherein the input gear has a plurality of internal splines configured to receive corresponding external splines on the axle shaft.

8. The portal assembly of claim 1, wherein the axle shaft is linked to the upper gear by means of a u-joint or constant velocity (CV) joint.

9. A portal assembly, comprising:
    a housing having a proximal side configured for attachment to a vehicle axle with a stub shaft extending through a proximal opening, and a distal side having a distal opening;
    a gear assembly disposed within the housing, the gear assembly comprising:
        an input gear linked to the stub shaft, the input gear configured to rotate around a first rotational axis in response to a rotational force from the stub shaft;
        an output gear having a proximal side disposed on a rotational support disposed along a second rotational axis spaced at a distance lower than the first rotational axis, the output gear configured to convert a rotational force of the input gear to rotation of the output gear;
        an output gear bearing coaxially disposed between a proximal side of the output gear and the rotational support, the output gear bearing configured to support the proximal side of the output gear;
        a pair of idler gears configured to transfer the rotational force from the input gear to the output gear;
    an output axle shaft having a proximal end configured to be received within the output gear and a distal end configured to extend through a distal opening, the output axle shaft; and configured to be driven by the output gear; and
    a unit bearing comprising a fixed portion having a mounting plate attached to the distal side to cover the distal opening and a rotating portion, the rotating portion configured to mate with the distal end of the output axle shaft so that a distal side of the output gear is fully supported by the unit bearing, wherein the unit bearing has fasteners extending therefrom for attachment to a wheel hub.

10. The portal assembly of claim 9, wherein the output gear is integrally formed with the output axle shaft.

11. The portal assembly of claim 9, wherein the output axle shaft has splines disposed at each of the distal end and the proximal end, wherein the proximal end engages with a corresponding spline in the output gear and the distal end engages with a corresponding spline in the unit bearing.

12. The portal assembly of claim 9, wherein the vehicle axle comprises a steering axle and the housing comprises a knuckle portion configured for replacement of an existing knuckle portion on the axle.

13. The portal assembly of claim 9, wherein the input gear has a plurality of internal splines configured to receive corresponding external splines on the stub shaft.

14. The portal assembly of claim 9, wherein the stub shaft is linked to the upper gear by means of a u-joint or constant velocity (CV) joint.

15. A portal assembly, comprising:
a housing having a proximal side configured for attachment to a vehicle axle with a stub shaft extending through a proximal opening and a distal side having a distal opening;
a gear assembly disposed within the housing and configured to effect a gear reduction from the stub shaft on a first rotational axis to an output axle shaft on a second rotational axis, wherein the second rotational axis is disposed at a lift spacing below the first rotational axis, and wherein the gear assembly comprises an output gear having a proximal side disposed on a rotational support along the second rotational axis spaced at a distance lower than the first rotational axis, the output gear configured to convert rotation along the first rotational axis to rotation of along the second rotational axis;
an output gear bearing coaxially disposed between a proximal side of the output gear and the rotational support, the output gear bearing configured to support the proximal side of the output gear; and
a unit bearing comprising a fixed portion attached to the distal side of the housing and a rotating portion configured to mate with a distal end of the output axle shaft extending through the distal opening, wherein a distal side of the output gear is fully supported by the unit bearing, wherein the unit bearing is configured for attachment to a wheel hub.

16. The portal assembly of claim 15, wherein the gear assembly comprises an upper gear disposed along the first rotational axis and a lower gear disposed along the second rotational axis.

17. The portal assembly of claim 16, further comprising a pair of idler gears configured to transfer rotational force from the input gear to the output gear.

18. The portal assembly of claim 16, wherein the output gear is integrally formed with the output axle shaft.

19. The portal assembly of claim 16, wherein the output axle shaft has splines disposed at each of the distal end and a proximal end, wherein the proximal end engages with a corresponding spline in the output gear and the distal end engages with a corresponding spline in the unit bearing.

20. The portal assembly of claim 15, wherein the vehicle axle comprises a steering axle and the proximal side of the housing comprises a knuckle portion configured for replacement of an existing knuckle portion on the vehicle axle.

* * * * *